(12) United States Patent
Penner

(10) Patent No.: US 9,573,509 B2
(45) Date of Patent: Feb. 21, 2017

(54) TRANSPORT DECK FRAME WITH SEPARATE TILE AND DUMP PIVOT CONNECTIONS

(71) Applicant: Douglas Penner, Brandon (CA)

(72) Inventor: Douglas Penner, Brandon (CA)

( * ) Notice: Subject to any disclaimer, the term of this patent is extended or adjusted under 35 U.S.C. 154(b) by 0 days.

(21) Appl. No.: 14/855,550

(22) Filed: Sep. 16, 2015

(65) Prior Publication Data

US 2016/0001690 A1 Jan. 7, 2016

Related U.S. Application Data

(62) Division of application No. 14/184,137, filed on Feb. 19, 2014, now Pat. No. 9,162,601.

(60) Provisional application No. 61/767,335, filed on Feb. 21, 2013.

(51) Int. Cl.
*B60P 1/28* (2006.01)
*B60P 1/16* (2006.01)
*B60P 1/64* (2006.01)

(52) U.S. Cl.
CPC .. *B60P 1/28* (2013.01); *B60P 1/16* (2013.01); *B60P 1/6454* (2013.01)

(58) Field of Classification Search
CPC .............. B60P 1/165; B60P 1/16; B60P 1/28; B60P 1/6454
USPC ................. 298/17.5, 17.8; 414/483
See application file for complete search history.

(56) References Cited

U.S. PATENT DOCUMENTS

| | | | | |
|---|---|---|---|---|
| 1,705,968 A * | 3/1929 | Eisenhut | ................... | B60P 1/12 298/17.5 |
| 3,355,043 A * | 11/1967 | Talbert | ............... | B62D 53/0821 280/415.1 |
| 3,610,690 A * | 10/1971 | Mengel | ..................... | B60P 1/16 298/17.5 |
| 4,056,283 A * | 11/1977 | Pow | ........................ | B60P 1/167 239/657 |
| 4,410,207 A * | 10/1983 | Scharf | ..................... | B60R 19/56 293/118 |
| 4,704,062 A * | 11/1987 | Hale | ..................... | B62D 53/062 280/441.2 |
| 5,338,101 A * | 8/1994 | Colip | .................... | B62D 53/062 280/789 |
| 6,527,494 B2 * | 3/2003 | Hurlburt | ............... | B62D 63/061 298/17.5 |
| 6,547,335 B2 * | 4/2003 | McSweeney | ........... | B60P 3/122 298/12 |
| 2002/0110442 A1 * | 8/2002 | Hurlburt | ............... | B62D 63/061 414/482 |
| 2009/0123260 A1 * | 5/2009 | Howard-Leicester | .. | B60P 3/122 414/475 |

* cited by examiner

*Primary Examiner* — Michael McCullough
*Assistant Examiner* — Mark Hageman
(74) *Attorney, Agent, or Firm* — Ryan W. Dupuis; Kyle R. Satterthwaite; Ade & Company, Inc.

(57) ABSTRACT

A deck for a truck or trailer has a base frame and a deck frame movable relative to the base frame to either one of a tilt position or a dump position. A first pivot connection between the frames defines the pivot axis of the tilt position while a second pivot connection separate and spaced from the first pivot connection defines the pivot axis of the dump position. A common lift mechanism between the frames lifts the deck frame to either one of the tilt or dump positions depending upon the operative condition of the first and second pivot connections.

13 Claims, 12 Drawing Sheets

Travel Position

Dump Position

Travel Position

Load/Unload Position (TILT)

Travel Position

Dump Position

"Hauler" Pivot Point
Travel Position

"Hauler" Pivot Point
Load/Unload Position (TILT)

TRANSPORT DECK FRAME WITH SEPARATE TILE AND DUMP PIVOT CONNECTIONS

FIELD OF THE INVENTION

The present invention relates to a deck frame for a truck or trailer which is supported on a wheeled base frame such that the deck frame is pivotal relative to the wheeled base frame from a transport position about a first axis to a tilt position in a tilt mode, for example for loading a vehicle onto the deck frame, and about a second axis to a dump position in a dump mode, for example for dumping the contents of the deck frame.

BACKGROUND

Trucks or trailers with transport decks are commonly available in two pivoting configurations, either a tilting configuration or a dumping configuration. In the tilting configuration, the pivot axis of the transport deck is usually spaced well ahead of the rear end to ensure the rear end is close to the ground and the deck is at a low inclination from horizontal for ease of loading wheeled vehicles thereon for example. In the dumping configuration, the pivot axis of the transport deck is typically positioned close to the rear of the transport deck to ensure the rear end of the deck is at or above the ground with sufficient clearance to permit lifting of the deck to a near vertical orientation.

Some attempts have been made to adjust the location of the pivot axis by incorporating components which are slidable relative to the base frame, the tilting deck frame or both. U.S. Pat. No. 5,678,978 by Markham discloses one example of a tiltable trailer deck with a displaceable frame; however, the sliding components may be difficult to operate and are not well suited to medium sized trailer configurations for towing with passenger trucks. Furthermore, the sliding components cannot be readily adapted to an integral truck deck.

U.S. Pat. No. 6,527,494 by Hurlbut discloses a single axis utility trailer for towing by passenger vehicles which includes tilt and dump functions; however, the single axis of the trailer is relied upon to define the pivot axis of the trailer deck when using the tilt function. Accordingly, the configuration of the deck frame is not adaptable for use with truck decks or dual axle trailers.

SUMMARY OF THE INVENTION

According to one aspect of the invention there is provided a transport deck assembly comprising:

a base frame arranged to be supported on wheels for rolling movement along the ground in a forward direction;

a deck frame extending longitudinally between opposing front and rear ends and arranged to be supported on the base frame in a horizontal transport position for rolling movement along the ground in the forward direction together with the base frame;

a first pivot connection defining a first pivot axis extending horizontally and perpendicularly to the forward direction about which the deck frame is arranged to be pivotal relative to the base frame from the transport position to a tilt position in which the deck frame extends upwardly and forwardly from the rear end to the front end thereof at a first inclination;

a second pivot connection defining a second pivot axis extending horizontally and perpendicularly to the forward direction, separately and spaced apart from the first pivot axis, such that the deck frame is arranged to be pivotal relative to the base frame about the second pivot axis to a dump position in which the deck frame extends upwardly and forwardly from the rear end to the front end thereof at a second inclination which is nearer to vertical than the first inclination; and a lift mechanism connected between the base frame and the deck frame so as to be arranged to lift a forward end of the deck frame relative to the base frame from the transport position to either one of the tilt position or the dump position.

By providing two separate pivot connections at different locations for alternately supporting the deck frame for pivoting about the first or second pivot axes relative to the base frame, a simple frame configuration provides both tilt and dump functions. Furthermore, the frame configuration can be readily adapted to single or dual axle, truck or trailer frames such that the base frame may comprise a trailer frame or a truck frame.

Preferably the assembly further comprises a mode selection member which is movable relative to the base frame between a first position in which the deck frame is pivotal relative to the base frame about the first pivot axis of the first pivot connection and a second position in which the deck frame is only pivotal relative to the base frame about the second pivot axis of the second pivot connection.

Preferably a location of the first pivot axis defined by the first pivot connection relative to the base frame is fixed.

Preferably the second pivot axis is spaced rearwardly from the first pivot axis.

Preferably the second pivot axis and the first pivot axis lie in a common plane which is substantially horizontal.

Preferably the rear end of the deck frame is adjacent to the ground in the tilt position and the first inclination corresponds to the deck frame being oriented less than 45 degrees from horizontal in the tilt position.

Preferably the second inclination corresponds to the deck frame being oriented less than 45 degrees from vertical in the dump position.

The base frame may comprise a pair of longitudinally extending frame members and the deck frame may comprise a pair of longitudinal extending frame members which extend along outer sides of respective ones of the frame members of the base frame so as to be substantially coplanar with one another in the transport position.

The assembly may be used in combination with a dump box have a skid base in which the deck frame is arranged to support the skid base of the dump box therein. In this instance, the deck frame preferably further comprises a winch supported at the front end thereof so as to be arranged to pull the dump box onto the deck frame from the ground in the tilt position of the deck frame.

In some embodiments, the base frame may include a main section and a pivot section which is pivotally coupled to the main section at the first pivot connection in which the deck frame is pivotally coupled to the pivot section of the base frame by the second pivot connection such that the deck frame and the pivot section are pivotal together relative to the main section of the base frame about the first pivot axis in a first mode and such that the deck frame is pivotal relative to both the main section and the pivot section of the base frame about the second pivot axis in a second mode.

In some embodiments, the assembly may further comprise a mode selection member which is movable relative to the base frame between a first position in which the pivot section of the base frame is pivotal relative to the main section of the base frame about the first pivot axis corresponding to the first mode and a second position in which the pivot section of the base frame is fixed relative to the main section of the base frame such that the deck frame is only pivotal relative to the base frame about the second pivot axis corresponding to the second mode. The mode selection member may be arranged to be coupled to the pivot section of the base frame at a location spaced forwardly of the first pivot axis.

The second pivot axis in this instance may be located adjacent a rear end of the pivot section.

When provided in combination with a dump box supported on the deck frame and including a front wall, a rear wall and two side walls spanning longitudinally between the front wall and the rear wall, the deck frame may further include a ground engaging fulcrum member supported at a location spaced rearwardly from the rear wall of the dump box in the transport position so as to be arranged to engage the ground in the dump position.

When the base frame comprises a pair of longitudinally extending side rails receiving the deck frame therebetween, the side rails may be arranged to support the first pivot connection thereon and support the second pivot connection thereon at a location spaced rearward from the first pivot connection.

The base frame and the deck frame may be arranged to be automatically released from one another at the second pivot connection when the base frame and the deck frame are coupled for pivotal movement relative to one another at the first pivot connection.

The base frame and the deck frame may further be arranged to be automatically released from one another at the first pivot connection when the base frame and the deck frame are coupled for pivotal movement relative to one another at the second pivot connection.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
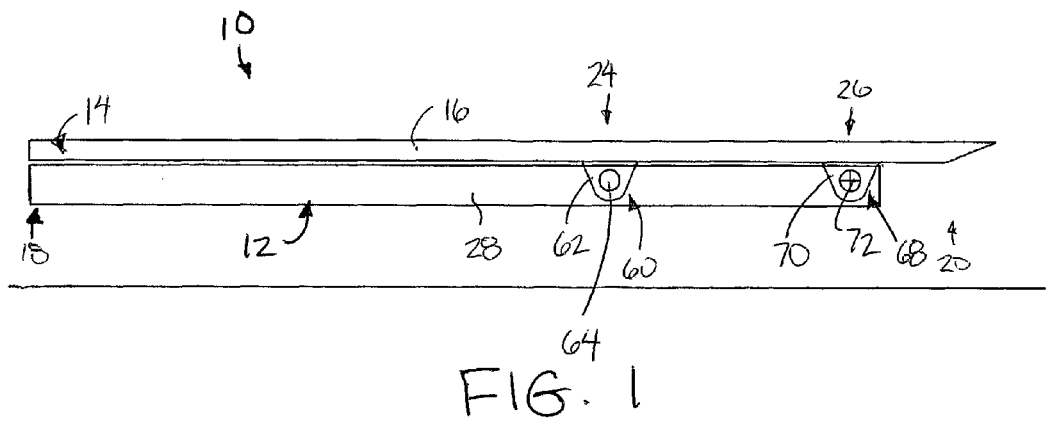
FIG. 1 is a side elevational view of the transport deck assembly according to a first embodiment in a transport position.

Referring to the accompanying figures, there is illustrated a transport deck assembly generally indicated by reference numeral 10. The assembly 10 generally includes a base frame 12 supported on wheels for rolling movement in a forward direction of normal use.

In some instances, the base frame may comprise an integral part of a truck or trailer frame, or alternatively the base frame may be arranged as an add-on component which can be subsequently mounted onto the chassis of a vehicle or the frame of a trailer in place of the normal installation of a deck or box. In either instance, the resulting base frame is fixed in orientation relative to the vehicle or trailer frame which is in turn supported on wheels by suitable suspension for rolling movement together therewith.

Although various embodiments are illustrated in the accompanying figures, the common features of the various embodiments will first be described.

The assembly 10 further comprises a deck frame 14 including 2 elongate frame members 16 extending in the longitudinal direction between a front end 18 and a rear end 20. Suitable cross members 22 are joined between the two longitudinal frame members 16 to support upper decking material thereon for carrying a load on the deck frame. The deck frame is arranged to rest on the base frame for carrying the load thereon in a transport position in which the deck frame is secured relative to the base frame in a horizontal orientation for rolling movement together with the base frame in the forward direction.

A first pivot connection 24 is located at a fixed location on the base frame for connection to the deck frame to define a first pivot axis oriented horizontally and perpendicularly to the forward direction about which the deck frame is pivotal relative to the base frame from the transport position to a tilt position in a first mode of operation. In the tilt position, the deck frame extends upwardly and forwardly from the rear end to the front end thereof at a first inclination which is less than 45 degrees from horizontal while the rear end of the deck frame is directly adjacent to the ground.

The assembly further includes a second pivot connection 26 arranged to be coupled between the base frame and the deck frame in a second mode of operation for defining a second pivot axis spaced rearwardly from the first pivot axis and at the same elevation so as to be in a common horizontal plane therewith. In the second mode of operation, the deck frame is pivotal relative to the base frame about the second axis defined by the second pivot connection from the transport or the tilt positions to a dump position in which the longitudinal direction of the deck frame is oriented at less than 45 degrees from vertical.

Typically, the base frame comprises two longitudinally extending frame members 28 which span the full length of the base frame and which are supported by the suspension on the axles of the wheels which may be arranged in a single axle or dual axle configuration.

The assembly 10 further includes a lift mechanism 30 connected between the base frame and the deck frame at a location spaced forwardly from the first and second pivot axes so as to be arranged to lift the forward end of the deck frame relative to the base frame from the transport position to either one of the tilt position or the dump position. The lift mechanism includes a lower pivot arm 32 and an upper pivot arm 34. The lower pivot arm is pivotally coupled at a first end on the base frame and at a second end to the upper pivot arm 34. The upper pivot arm is pivotally coupled to the lower arm at a first end and pivotally coupled to the deck frame at the opposing second end. The pivotal connections all permit relative pivotal movement about horizontal axes oriented perpendicular to the forward direction.

The lift mechanism also includes a hydraulic actuator 36 coupled at opposing ends to the lower arm and the upper arm respectively at intermediate locations thereon such that retracting the linear actuator causes the arms to be folded relative to one another for lowering the base frame to the transport position. Alternatively, extending the actuator 36 causes the upper and lower arms to be unfolded relative to one another to lift the front end of the deck from the transport position to either one of the tilt or dump positions.

The assembly 10 may further include a dump box attachment 38 which is arranged to be selectively supported on the deck frame. The dump box typically has a skid base arranged for being slidably mounted onto the deck frame and which defines a floor of the dump box. The dump box further includes a front wall 40, a rear wall 42 and two side walls 44 spanning longitudinally along opposing sides between the front and rear walls. The walls form a perimeter about the floor defined by the skid base 46.

The assembly 10 further includes a winch 48 mounted at the front end of the deck frame for loading or unloading the dump box from the deck frame in the tilt position. The transport deck assembly can be positioned in the tilt position such that the rear end of the deck frame is adjacent the ground. When the rear end of the deck frame is located in proximity to the front end of the dump box on the ground, the winch 48 can then be connected to the front end of the skid base and operated to tow the skid base of the dump box onto the deck frame. Suitable latching can retain the dump box on the deck frame once the front end of the dump box is towed to the front end of the deck frame. Thereafter the deck frame can be operated between the transport position and the dump position for selectably dumping the contents of the dump box in a conventional dumping arrangement.

In the embodiments of FIGS. 1 through 10, 12 and 13 a mode selection member 50 is further provided for movement between a first position corresponding to the first mode of operation and a second position corresponding to the second mode of operation. More particularly, in the first position the deck frame is readily pivotal relative to the base frame about the first pivot axis of the first pivot connection. Alternatively, in the second position, the deck frame is only pivotal relative to the base frame about the second pivot axis of the second pivot connection for operation in the dump mode.

Turning now more particularly to the embodiment of FIGS. 1 through 4, the base frame in this instance is an integral trailer frame which is generally U-shaped in configuration such that the two elongate frame members 28 extend along opposing sides of the frame while being joined by a front cross bar 52 between the front ends thereof. Suitable hitch arms 54 connect to the base frame for connection to a towing vehicle. The suspensions for the wheels are supported at the outer sides of the longitudinal frame members 28.

In this instance, the longitudinal members 16 of the deck frame also extend along respective opposing sides of the deck frame so as to be adjacent to and alongside the corresponding inner sides of the two longitudinal frame members of the base frame respectively. The frame members all lie in a generally common plane in the transport position. The first pivot connection in this instance comprises two first pivots 58 in which each pivot is coupled between a respective longitudinal frame member of the base frame and a respective longitudinal frame member of the deck frame.

Furthermore, each first pivot comprises a first pivot block 60 on the base frame and a second pivot block 62 on the deck frame having respective bores therein arranged to selectively receive a common pivot shaft 64 through the bores when engaged such that the pivot blocks are pivotal relative to one another about the axis of the pivot shaft when engaged. The pivot shafts 64 of the two pivots commonly defining the first pivot connection lie on a common axis, and are each axially slidable for being selectably released from one of the pivot blocks in the second mode of operation.

The second pivot connection similarly comprises two second pivots 66 in which each pivot comprises a respective first pivot block 68 mounted on a respective one of the longitudinal frame members of the base frame and a second pivot block 70 mounted on a respective one of the longitudinal frame members of the deck frame, each at a location spaced rearwardly along the frame member from a corresponding pivot block of the first pivot connection. Pivot shafts 72 are similarly received through the respective first and second pivot blocks of the respective second pivot 66 with the two shafts 72 being aligned along a common axis and the two shafts also being axially slidable in respective bores for being selectively released from one of the pivot blocks. In this instance, the pivot shafts of the first connection are engaged in the first tilt mode of operation, while only the pivot shafts of the second pivot connection are engaged in the second dump mode of operation.

The mode selection member in the illustrated embodiment comprises a pair of lever arms 74 mounted at respective opposing sides on the base frame. Each lever arm is pivotally coupled to the base frame at a central location in the longitudinal direction thereon between longitudinally opposed ends. A forward end of each lever arm is pivotally coupled to the inner end of a respective pivot shaft 64 of the first pivot connection while the rear end is pivotally coupled to the inner end of a respective pivot shaft 72 of the second pivot connection. All pivotal connections of the lever arms are about vertical axes.

The lever arm is pivotal relative to the base frame such that only one of the associated pivot shafts can be engaged at any one time. Furthermore, both lever arms are coupled to one another by a hydraulic actuator 76 coupled between the lever arms at respective locations spaced forwardly from the pivotal connections to the base. In this instance, extending the hydraulic actuator operates to insert the pivot shafts 64 into the respective pivot blocks forming the first pivot connection while releasing the pivot shafts 72 of the second pivot connection automatically to ensure that the deck frame is only pivotal relative to the base frame about the first pivot axis. By locating the first pivot axis forwardly of the second pivot connection components, the deck frame is free to be lowered relative to the base frame at the rear end thereof at the location of the second pivot connections.

Alternatively when retracting the hydraulic actuator 76, the forward ends of the lever arms 74 are pulled together to release the pivot shafts 74 of the first pivot connection while engaging the pivot shafts 72 of the second pivot connection. Accordingly, the deck frame in this instance is only pivotal about the second pivot axis which is located at the rear end of the base frame rearwardly from the first pivotal connection components on both the base frame and the deck frame. The second pivot axis is closer to the rear end of the deck frame than the height of the second axis from the ground to provide sufficient clearance so that the deck frame can be elevated to a near vertical position.

Turning now to the embodiment of FIGS. 5 through 10, the base frame in this instance comprises a main section 80 defined by the longitudinal frame members 28 at respective locations spaced inwardly from the wheels upon which the base frame is carried by the suspension. The deck frame in this instance also comprises the two longitudinal frame members 16 which are arranged in the transport position to be coplanar with the frame members of the base frame while extending along outer sides of the respective ones of the frame members of the base frame inward from respective wheels.

The base frame in this instance further includes a pivot section 82 comprised of a pair of longitudinally extending beams 84. Each beam 84 is pivoted at a central location at the rear end of a corresponding one of the longitudinal frame members of the base frame. The two beams 84 are pivoted together to define the first pivotal connection 24 which corresponds to pivoting of the pivot section 82 relative to the main section of the base frame about the first pivot axis oriented horizontally and perpendicularly to the forward direction.

In this instance, the rear ends of the two beams 84 of the pivot section are in turn pivotally coupled to the longitudinal frame members of the deck frame adjacent the rear ends thereof but at a location spaced slightly forwardly from the rear end to define the second pivotal connection 26. In this instance, the deck frame is pivotal with the pivot section 82 relative to the main section of the base frame about the first pivot axis of the first pivot connection in the first mode of operation from the transport position to the tilt position.

Alternatively, if the pivot section is fixed relative to the main section of the base frame, the deck frame is pivotal relative to both the pivot section and the main section of the base frame in the second mode of operation about the second pivot axis of the second pivot connection from the transport position to the dump position.

Figure 6:
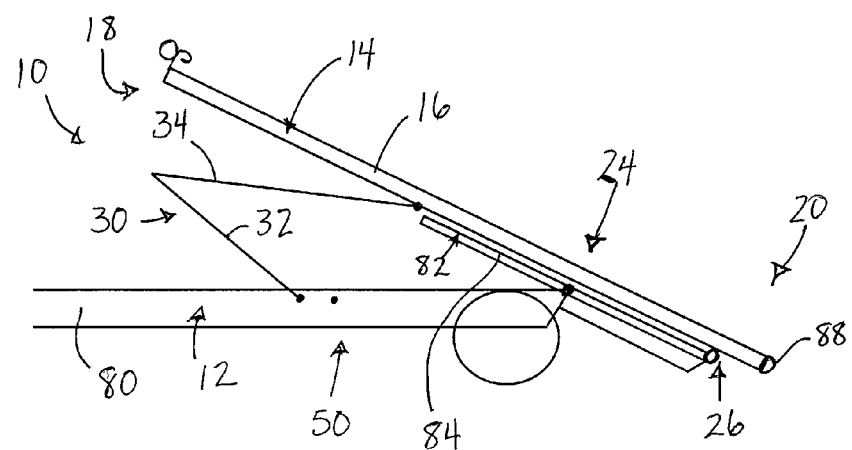
FIG. 6 is a side elevational view of the transport deck assembly according to the second embodiment of FIG. 5 in a tilt position.
Figure 8:
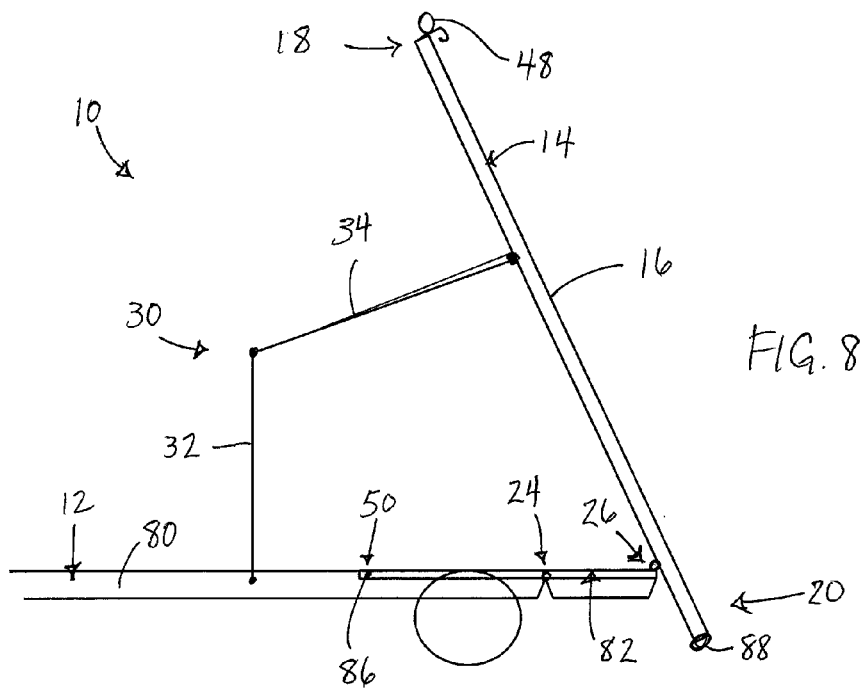
FIG. 8 is a side elevational view of the transport deck assembly according to the second embodiment of FIG. 5 in a dump position.
Figure 9:
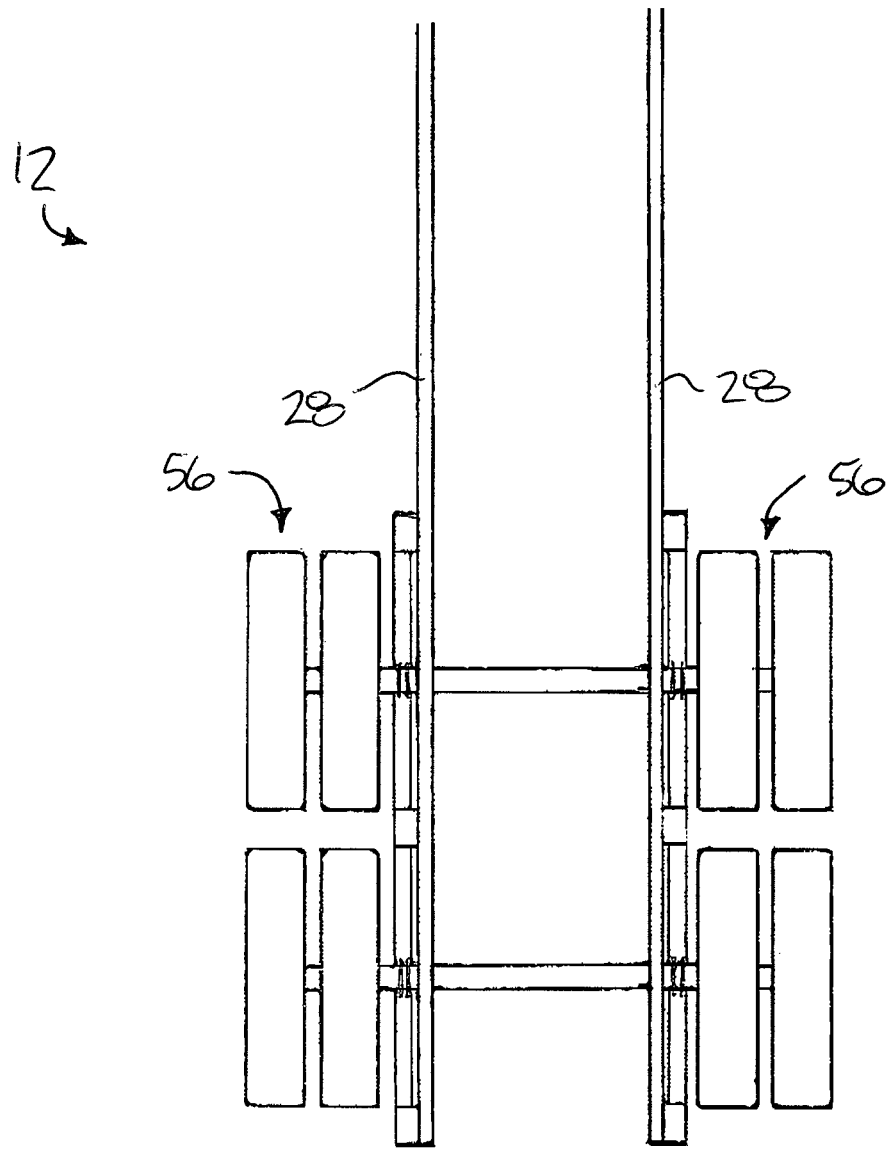
FIG. 9 is a top plan view of a wheeled base frame arranged to support the transport deck assembly according to the second embodiment of FIG. 5.
Figure 10:
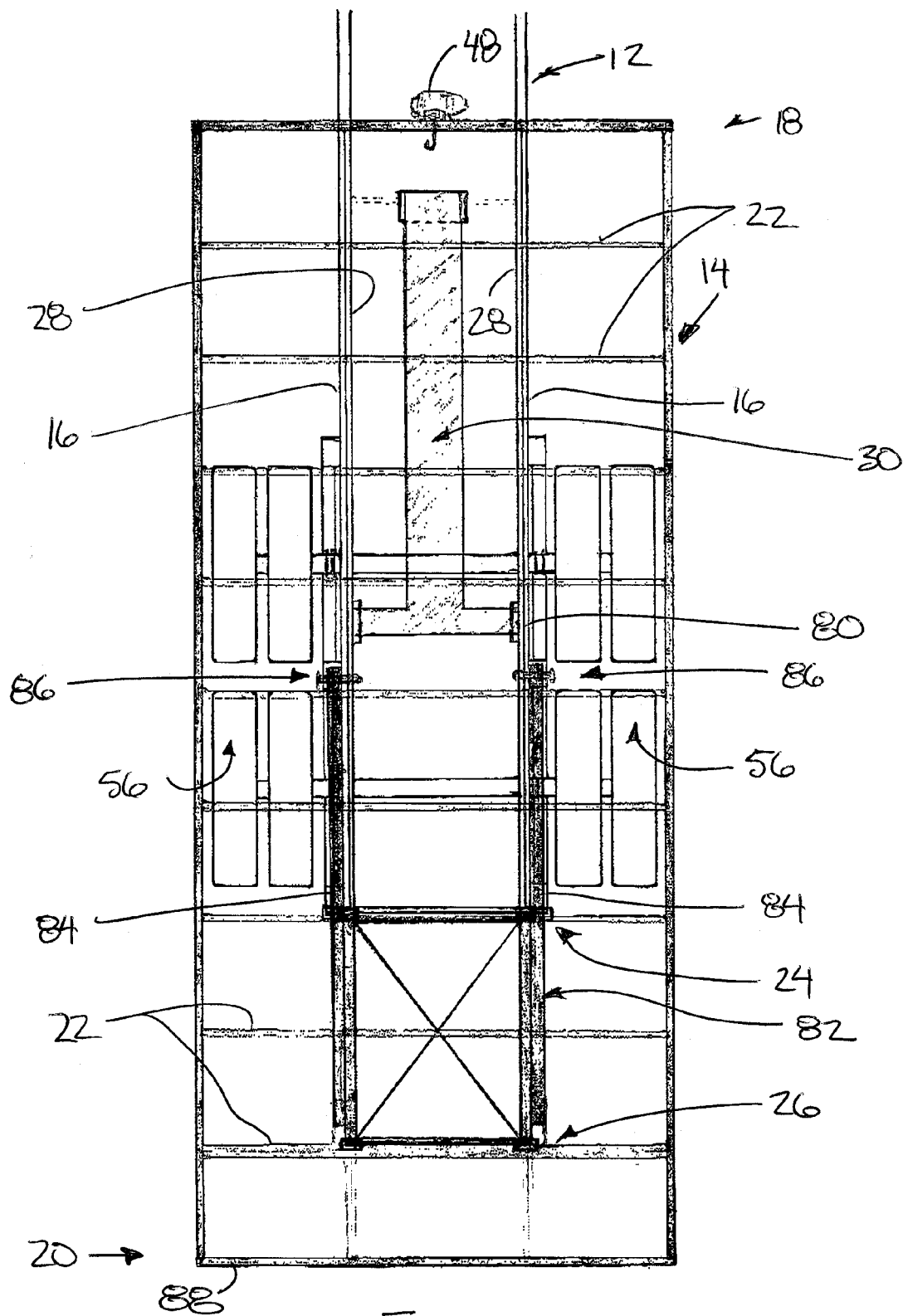
FIG. 10 is a top plan view of the transport deck assembly according to the second embodiment of FIG. 5 shown supported in the transport position on the wheeled base frame of FIG. 9.

The mode selection member in this instance simply comprises a retainer pin 86 which is arranged to be received through cooperating apertures at the front ends of the beams of the pivot section and through the longitudinal frame members of the main section of the base frame at a location spaced forwardly of the first axis so that the cooperating apertures are aligned in the transport position. The mode selection member is thus effectively movable between a first position released from the cooperating apertures such that the pivot section and deck frame are freely pivotal together about the first pivot axis as shown in FIG. 6. Alternatively, in a second position of the retainer pin, the pin is engaged through the cooperating apertures to fix the pivot section relative to the main section of the base frame such that the only movement permitted is pivotal movement of the deck frame relative to the base frame about the second pivot axis of the second pivot connection as shown in FIG. 8.

Although the pivot section may be retained relative to the deck frame for pivoting into the tilt position, the location of the second pivot axis rearward of the first pivot axis effectively causes the pivot section and deck frame to remain pivotal together about the first pivot axis even if they are not locked together to prevent relative pivotal movement therebetween about the second axis. Accordingly, the deck frame can be pivoted into the tilt position about the first axis from the transport position without locking the pivot section in fixed relation to the deck frame.

Figure 7:
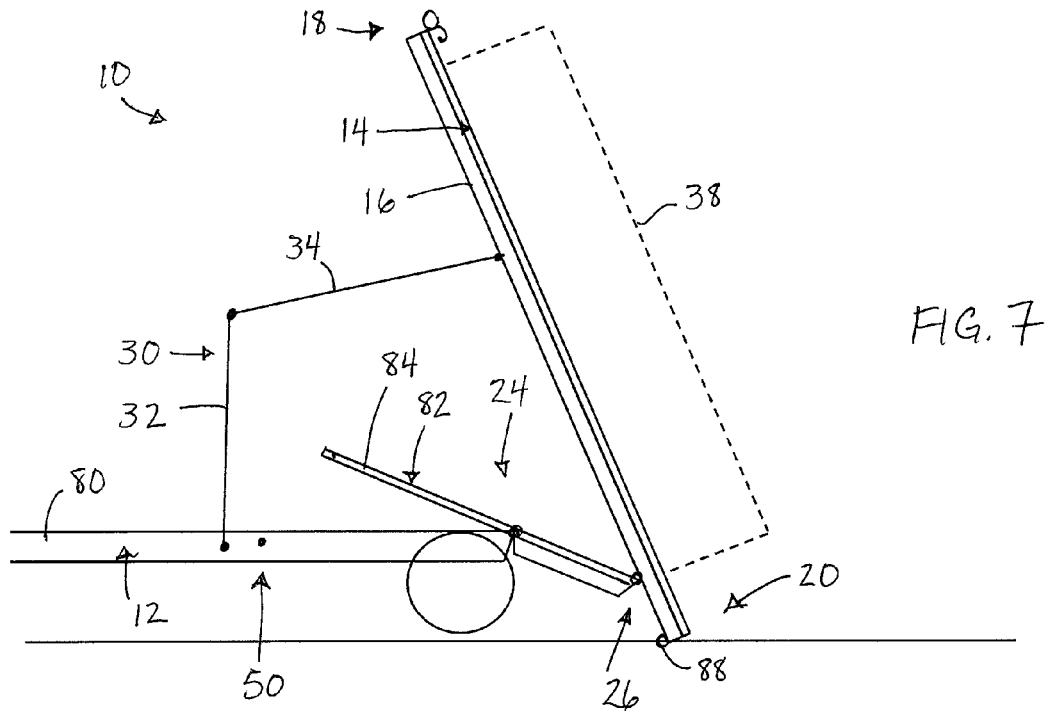
FIG. 7 is a side elevational view of the transport deck assembly according to the second embodiment of FIG. 5 in an auxiliary dump position.

This arrangement permits continued pivoting from the tilt position to an auxiliary dump position shown in FIG. 7 by continued extension of the lift mechanism beyond the tilt position with the mode selection member in the first released position. In this arrangement, the rear end of the deck frame defines a ground engaging fulcrum 88 about which the deck frame is pivotal from the tilt position to the auxiliary dumping position. The ground engaging fulcrum at the rear end of the deck frame engages the ground in the tilt position such that the deck frame pivots about the fulcrum engaged with the ground from the tilt position to a more vertical configuration of the auxiliary dumping position corresponding to the deck frame being less than 45 degrees from vertical.

If providing a dump box, the rear wall of the dump box is typically spaced forwardly of the ground engaging fulcrum 88 at the rear of the deck to provide ground clearance between the rear end of the dump box and the fulcrum 88 of the rear end of the deck engaged with the ground. The displacement of the deck frame from the tilt position to the auxiliary dumping position further corresponds to a pivoting movement of the deck frame relative to both the main section and pivot section of the base frame about the second axis of the second pivot connection due to the pivot section remaining unrestrained relative to the deck frame.

Figure 11:
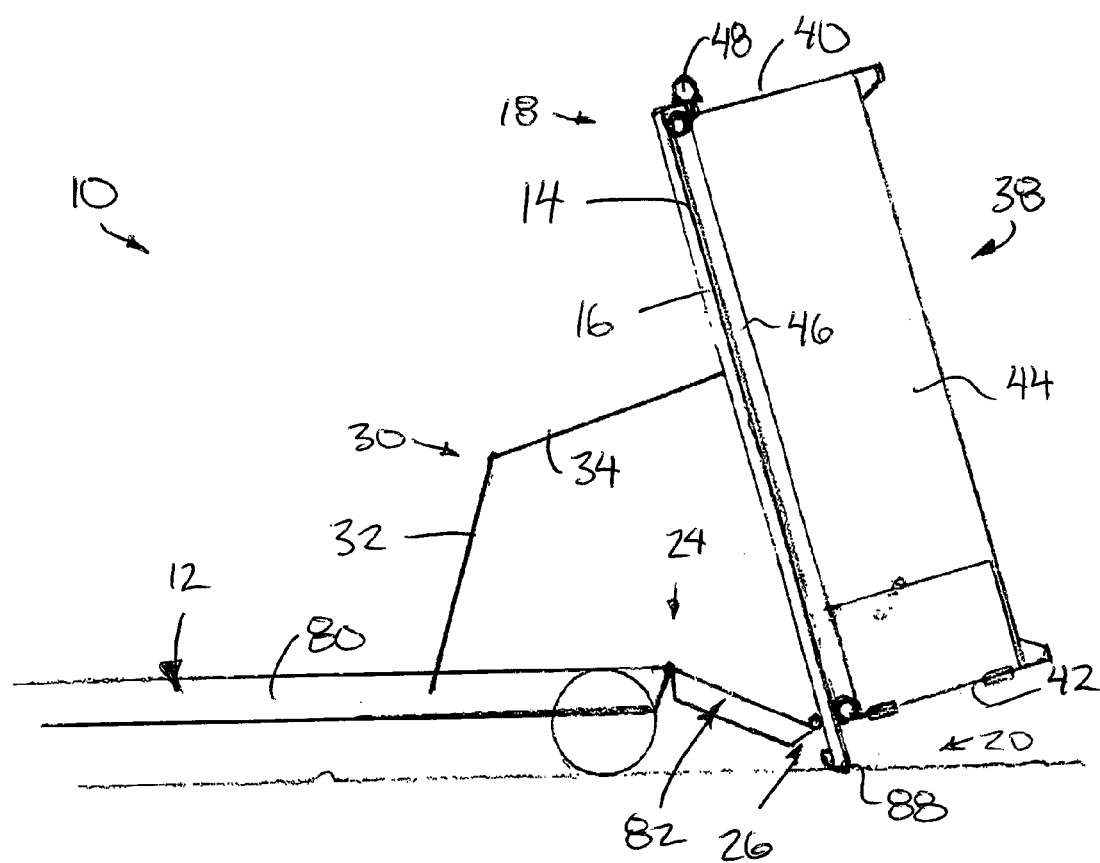
FIG. 11 is a side elevational view of the transport deck assembly according to a third embodiment of FIG. 5 in a dump position.
Figure 12:
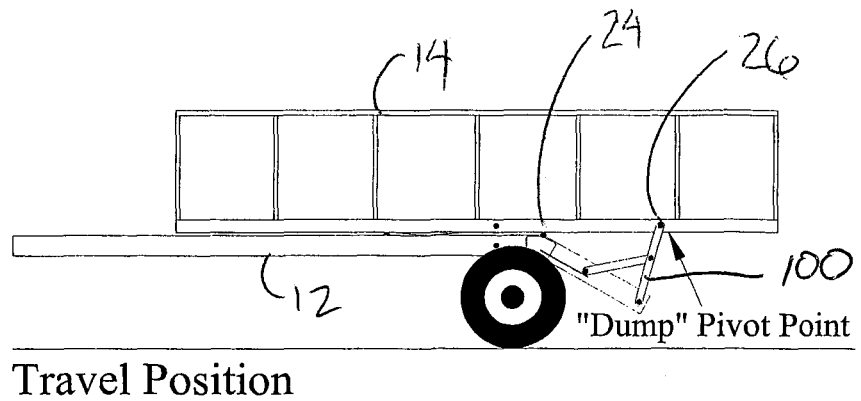
FIG. 12 is a side elevational view of a further embodiment of the transport deck assembly in a travel position with a pivot linkage in a working position.
Figure 13:
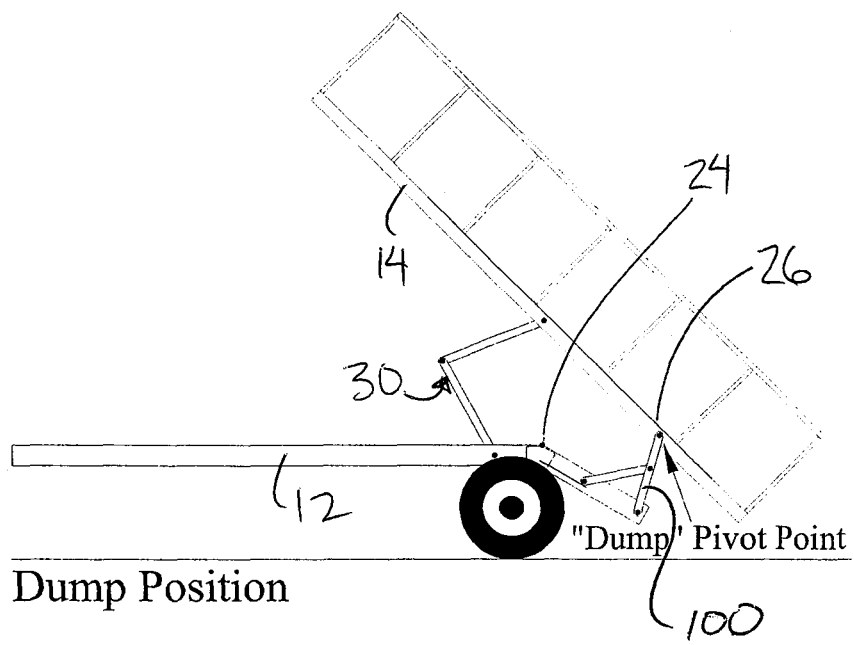
FIG. 13 is a side elevational view of the assembly according to FIG. 12 in a dump position using the pivot linkage.
Figure 14:
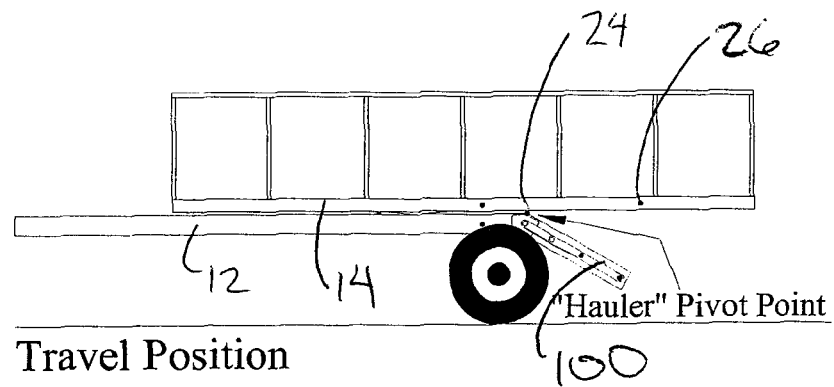
FIG. 14 is a side elevational view of the assembly according to FIG. 12 in a travel position with the pivot linkage in a stored position.
Figure 15:
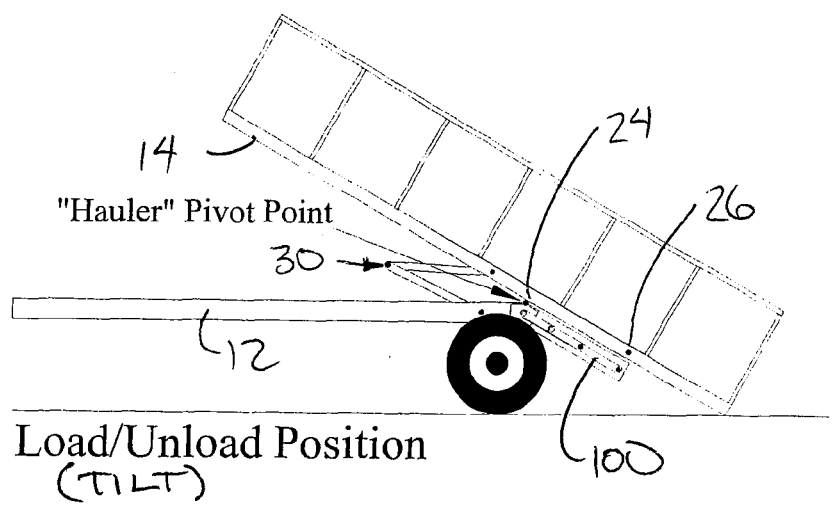
FIG. 15 is a side elevational view of the assembly according to FIG. 12 in a tilt position in which the pivot linkage remains in the stored position.
Figure 16:
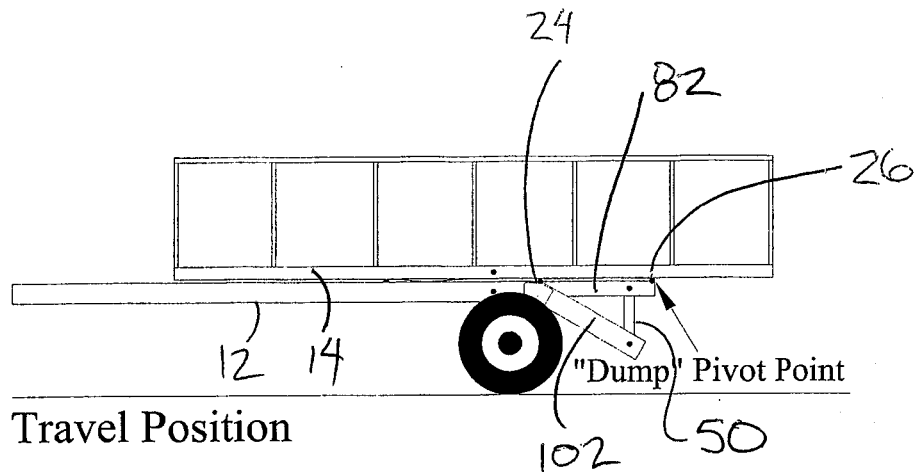
FIG. 16 is a side elevational view of yet another embodiment of the transport deck assembly in a travel position with an alternate pivot linkage in a working position.
Figure 17:
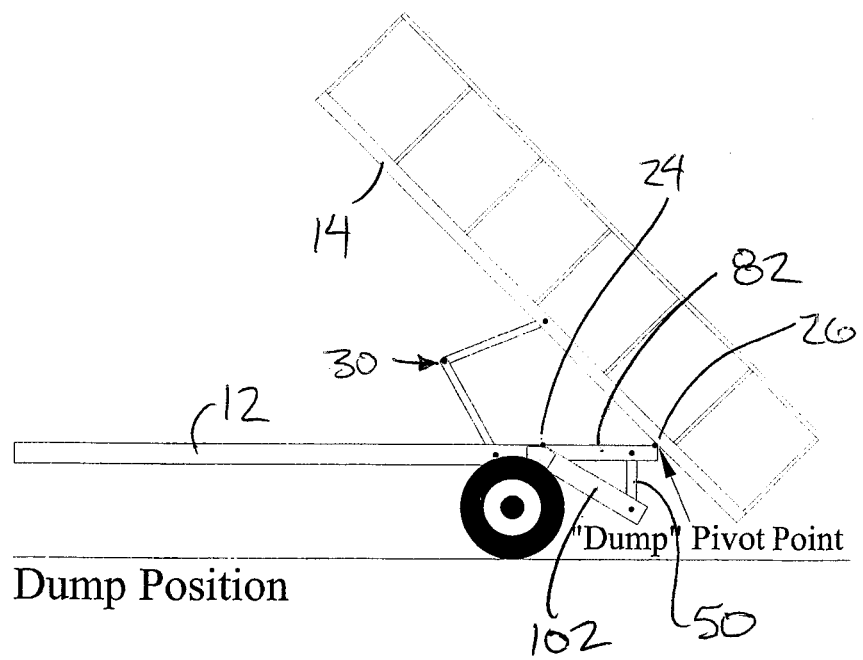
FIG. 17 is a side elevational view of the assembly according to FIG. 16 in a dump position using the pivot linkage.
Figure 18:
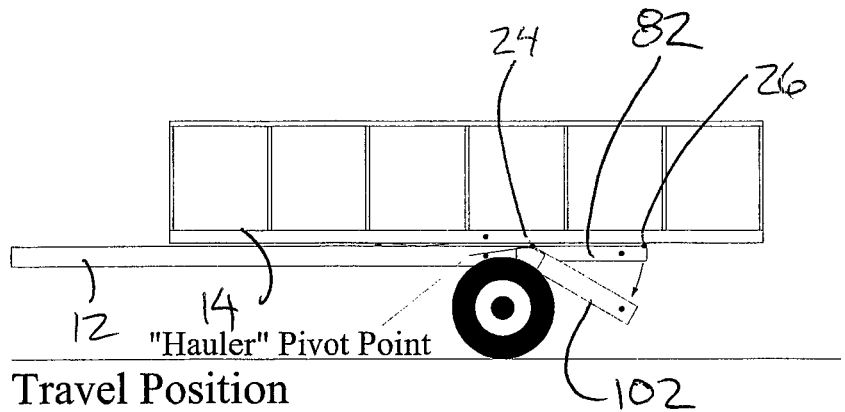
FIG. 18 is a side elevational view of the assembly according to FIG. 16 in a travel position with the pivot linkage in a stored position.
Figure 19:
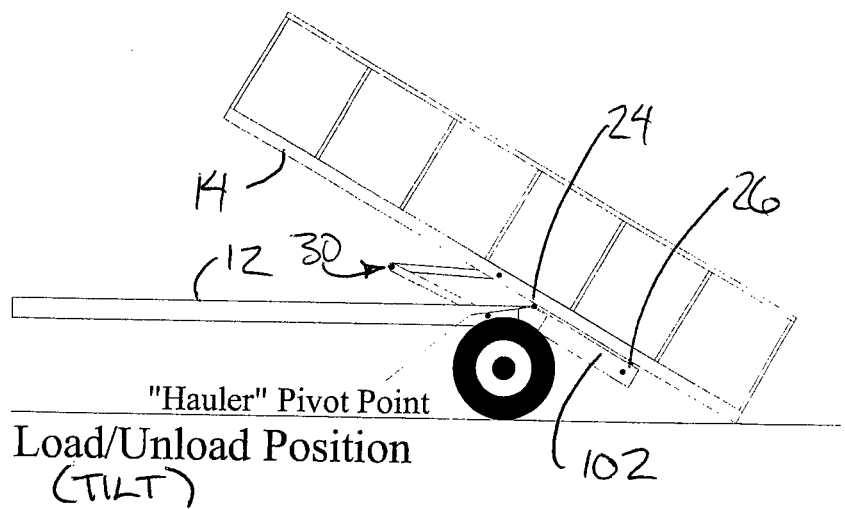
FIG. 19 is a side elevational view of the assembly according to FIG. 16 in a tilt position in which the pivot linkage remains in the stored position.

Turning now to the embodiment of FIG. 11, the assembly in this instance is substantially identical to the previous embodiment with the exception of the pivot section 82 of the base frame remaining freely pivotal relative to the main section so that no mode selection member is required. More particularly, the pivot section is pivotally coupled at its forward end to the rear end of the main section to define the first pivotal connection 24. In this instance, initial operation of the lift mechanism causes the deck frame to be pivoted about the first pivot connection from the transport position to the tilt position as described above. Then also as described above with regard to the auxiliary dumping position of FIG. 7, continued extension of the lift mechanism causes the ground engaging fulcrum 88 at the rear end of the deck to engage the ground and allow further upward pivoting into the dump position by allowing pivotal movement between the deck frame and the second pivot connection at the rear end of the pivot section of the base frame.

Figure 2:
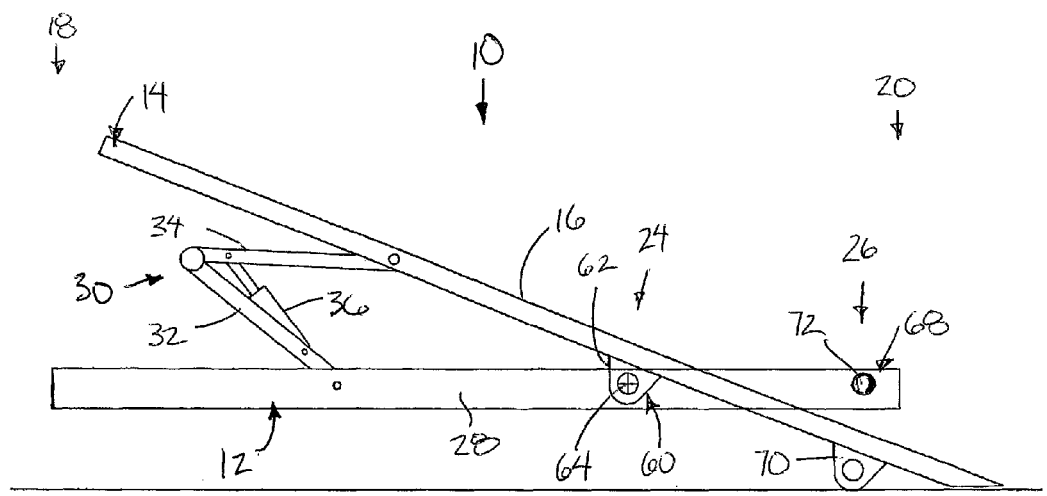
FIG. 2 is a side elevational view of the transport deck assembly according to the first embodiment of FIG. 1 in a tilt position.
Figure 3:
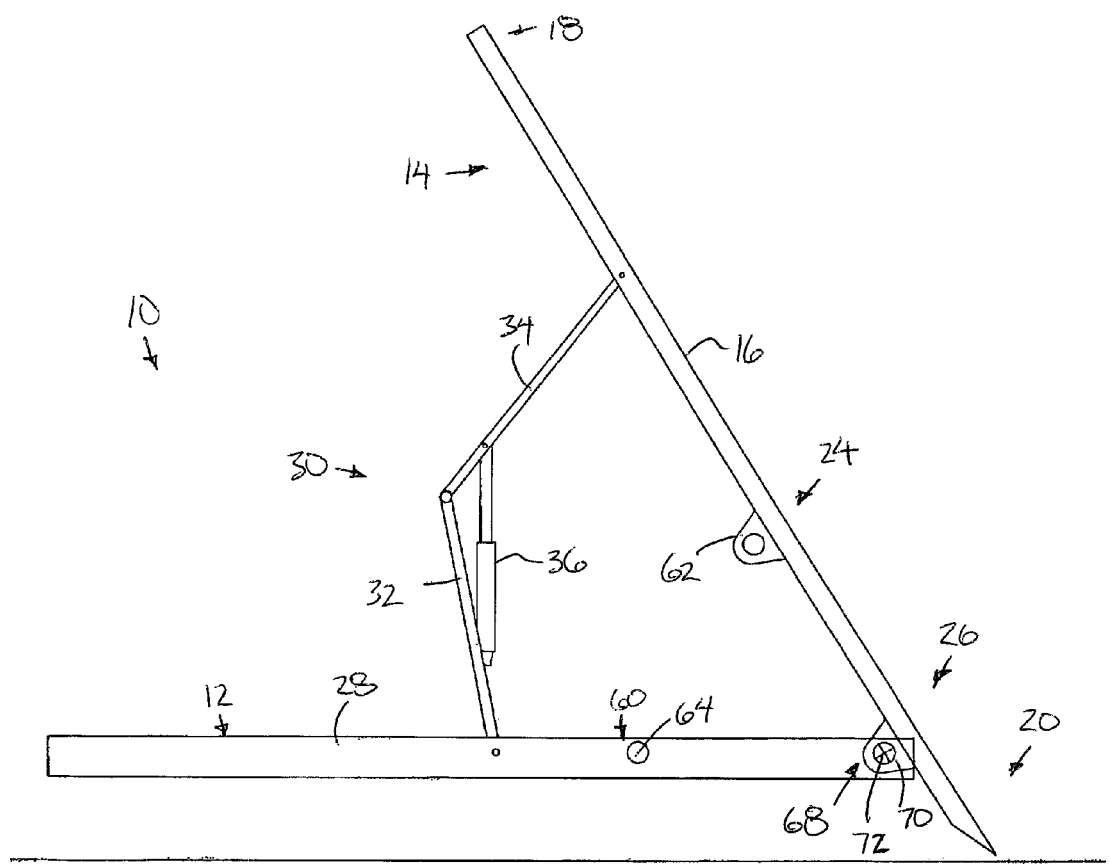
FIG. 3 is side elevational view of the transport deck assembly according to the first embodiment of FIG. 1 in a dump position.
Figure 4:
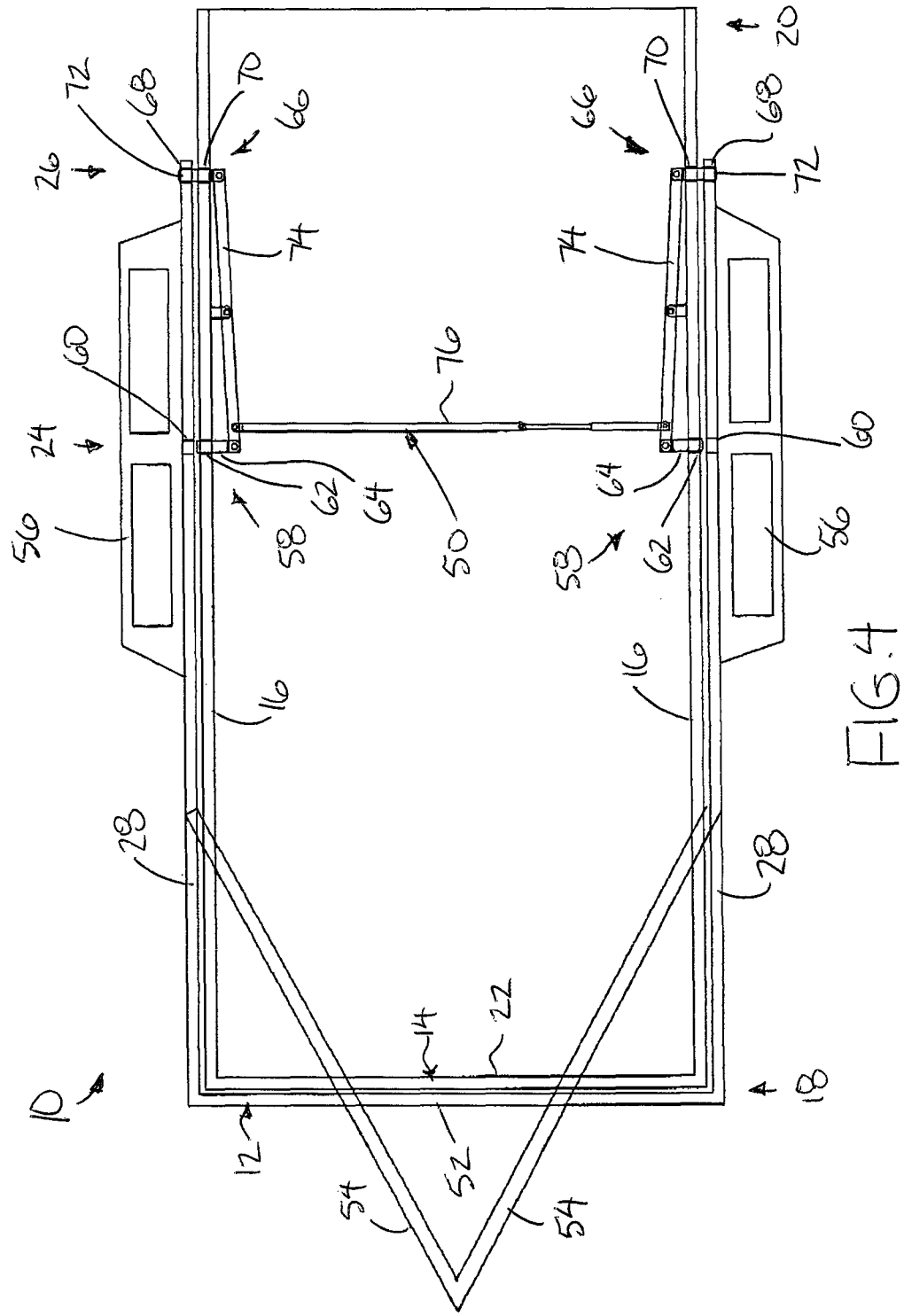
FIG. 4 is a top plan view of the transport deck assembly in the transport position according to the first embodiment of FIG. 1.
Figure 5:
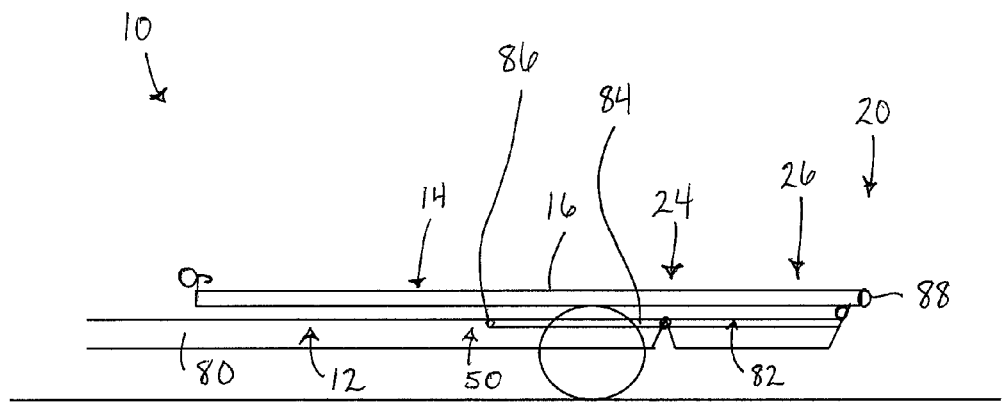
FIG. 5 is a side elevational view of the transport deck assembly according to a second embodiment in a transport position.

Turning now to the embodiment of FIGS. 12 through 15, the assembly 10 in this instance is similar to the first embodiment of FIGS. 1 to 3 in that the first pivot connection is at a fixed location directly between the deck frame 14 and the base frame while the deck frame is selectively coupled and uncoupled relative to the base frame at the second pivot connection. The first pivot connection may differ however in that the first pivot connection may simply comprises a fulcrum on the base frame about which the deck frame is pivotal by resting thereon in the first mode of operation when the second pivot connection is disconnected. The second pivot connection in this embodiment is supported on a collapsible linkage portion 100 of the base frame.

In the first mode of operation, the linkage 100 is folded into a stored position such that the linkage and the second pivot connection thereon is spaced below the rear end of the deck frame while the deck frame remains in the travel position. Accordingly, the linkage 100 in the stored position does not interfere with pivoting of the deck frame into the tilt position.

Alternatively, in the second mode of operation, the linkage 100 is extended into a working position such that the second pivot connection thereon is supported at the same elevation as the first pivot connection. The mode selection member in this instance takes the form of a pin connection between the second pivot connection on the linkage portion 100 of the base frame and the corresponding location on the deck frame to allow pivoting of the deck frame into the dump position.

Turning now to the embodiment of FIGS. 16 through 19, the assembly 10 in this instance is similar to the embodiment of FIGS. 5 through 8 in that the base frame comprises a main section 80 and a pivot section 82 at the rear end which is pivotal relative to the main second at the first pivotal connection 24. The second pivot connection is located at the rear end of the pivot section 82 and remains connected between the pivot section 82 of the base frame and the deck frame in either mode of operation. The first pivot connection comprises a fulcrum on the base frame about which the deck frame is pivotal by resting thereon in the first mode of operation when the second pivot connection is freely movable with the pivot section 82 and the deck frame about the first axis. Similar to the embodiment of FIGS. 5 to 8, the mode selection member 50 in this instance is retainer which is arranged to be selectively fixed between the pivot section 82 and an inclined portion 102 of the base frame. The inclined portion 102 is a fixed portion at the rear of the base frame which is inclined downwardly and rearwardly so as not to interfere with pivoting of the deck frame into the tilt position in the first mode of operation. The mode selection member is thus effectively movable between a first position released from the pivot section such that the pivot section and deck frame are freely pivotal together about the first pivot axis, and alternatively, a second position in which the member 50 locks the pivot section relative to the fixed inclined portion of the base frame such that the only movement permitted is pivotal movement of the deck frame relative to the base frame about the second pivot axis of the second pivot connection.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A transport deck assembly comprising:
   a base frame arranged to be supported on wheels for rolling movement along the ground in a forward direction;
   a deck frame extending longitudinally between opposing front and rear ends and arranged to be supported on the base frame in a horizontal transport position for rolling movement along the ground in the forward direction together with the base frame;
   a first pivot connection at a first location on the base frame in fixed relation to the base frame and defining a first pivot axis extending horizontally and perpendicularly to the forward direction about which the deck frame is selectively arranged to be pivotal relative to the base frame from the transport position to a tilt position in which the deck frame extends upwardly and forwardly from the rear end to the front end thereof at a first inclination;
   a second pivot connection at a second location on the base frame in fixed relation to the first axis and to the base frame and defining a second pivot axis extending horizontally and perpendicularly to the forward direction, separately and spaced apart from the first pivot axis, such that the deck frame is arranged to be selectively pivotal relative to the base frame about the second pivot axis to a dump position in which the deck frame extends upwardly and forwardly from the rear end to the front end thereof at a second inclination which is nearer to vertical than the first inclination; and
   a lift mechanism connected between the base frame and the deck frame so as to be arranged to lift a forward end of the deck frame relative to the base frame from the transport position to either one of the tilt position or the dump position;
   the deck frame being operable in a first mode in which the first pivot connection is engaged and the second pivot connection is disengaged so as to enable pivotal movement of the deck frame into the tilt position from the transport position about the first pivot axis; and
   the deck frame being operable in a second mode in which the second pivot connection is engaged and the first pivot connection is disengaged so as to enable pivotal movement of the deck frame into the dump position from the transport position about the second pivot axis.

2. The assembly according to claim 1 further comprising a mode selection member which is movable relative to the base frame between a first position in which the deck frame is pivotal relative to the base frame about the first pivot axis of the first pivot connection and a second position in which the deck frame is only pivotal relative to the base frame about the second pivot axis of the second pivot connection.

3. The assembly according to claim 1 wherein the second pivot axis is spaced rearwardly from the first pivot axis.

4. The assembly according to claim 1 wherein the second pivot axis and the first pivot axis lie in a common plane which is substantially horizontal.

5. The assembly according to claim 1 wherein the rear end of the deck frame is adjacent to the ground in the tilt position and the first inclination corresponds to the deck frame being oriented less than 45 degrees from horizontal in the tilt position.

6. The assembly according to claim 1 wherein the second inclination corresponds to the deck frame being oriented less than 45 degrees from vertical in the dump position.

7. The assembly according to claim 1 wherein the base frame comprises a trailer frame.

8. The assembly according to claim 1 wherein the base frame comprises a truck frame.

9. The assembly according to claim 1 wherein the base frame comprises a pair of longitudinally extending frame members and the deck frame comprises a pair of longitudinal extending frame members which extend along outer sides of respective ones of the frame members of the base frame so as to be substantially coplanar with one another in the transport position.

10. The assembly according to claim 1 in combination with a dump box having a skid base, wherein the deck frame is arranged to support the skid base of the dump box therein and wherein the deck frame further comprises a winch supported at the front end thereof so as to be arranged to pull the dump box onto the deck frame from the ground in the tilt position of the deck frame.

11. The assembly according to claim 1 wherein the base frame comprises a pair of longitudinally extending side rails receiving the deck frame therebetween, the side rails being arranged to support the first pivot connection thereon and support the second pivot connection thereon at a location spaced rearward from the first pivot connection.

12. The assembly according to claim 1 wherein the base frame and the deck frame are arranged to be automatically released from one another at the second pivot connection when the base frame and the deck frame are coupled for pivotal movement relative to one another at the first pivot connection.

13. The assembly according to claim 1 wherein the base frame and the deck frame are arranged to be automatically released from one another at the first pivot connection when the base frame and the deck frame are coupled for pivotal movement relative to one another at the second pivot connection.

* * * * *